United States Patent
Chai et al.

(10) Patent No.: US 6,921,901 B1
(45) Date of Patent: *Jul. 26, 2005

(54) LUTETIUM YTTRIUM ORTHOSILICATE SINGLE CRYSTAL SCINTILLATOR DETECTOR

(75) Inventors: Bruce H. T. Chai, Oviedo, FL (US); Yangyang Ji, Orlando, FL (US)

(73) Assignees: Crystal Photonics, Inc., Sanford, FL (US); Research Foundation of the University of Central Florida, Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/623,226

(22) Filed: Jul. 18, 2003

Related U.S. Application Data

(62) Division of application No. 09/506,160, filed on Feb. 17, 2000, now Pat. No. 6,624,420.
(60) Provisional application No. 60/120,500, filed on Feb. 18, 1999.

(51) Int. Cl.$^7$ .......................... G01T 1/202; C09K 11/08
(52) U.S. Cl. .............................. 250/361 R; 252/301.4 F
(58) Field of Search ................ 250/361 R; 252/301.4 F

(56) References Cited

U.S. PATENT DOCUMENTS

| | | | | |
|---|---|---|---|---|
| 4,549,083 A | * | 10/1985 | Ozawa ..................... | 250/458.1 |
| 4,664,744 A | * | 5/1987 | Le Gal et al. .................. | 117/3 |
| 4,928,017 A | * | 5/1990 | Kemmler-Sack et al. | 250/483.1 |
| 4,958,080 A | * | 9/1990 | Melcher ................... | 250/483.1 |

(Continued)

FOREIGN PATENT DOCUMENTS

| DE | 2234968 | * | 1/1973 |
|---|---|---|---|
| GB | 1336518 | * | 11/1973 |

OTHER PUBLICATIONS

IEEE Transactions on Nuclear Science, vol. 36, No. 1, Feb. 1989, Ishibashi, et al. "Cerium Doped GSO Scintillators and its Application to Position Sensitive Detectors" pp. 170–172.*

IEEE Transactions on Nuclear Science, vol. 40, No. 4, Aug. 1993, Daghighian, et al. "Evaluation of Cerium Doped Lutetium Oxyorthosilicate (LSO) Scintillation Crystal for PET" 1045–1047.*

IEEE Transactions on Nuclear Science, vol. 43, No. 3, Jun. 1996, Novotny, et al. "A Plastic–BaF2 Phoswich Telescope for Charged/Neutral Particle and Photon Detection" pp 1260–1266.*

Melcher et al. Czochralski growth of rare earth oxyorthosilicate single crystals. J. of Crystal Growth, vol. 128 (1993), pp. 1001–1005.*

Loutts et al. Czochralski growth and caharcterization of (Lu1–xGdx)2SiO5 single crystals for scintillators. J. of Crystal Growth, vol. 174 (1997), pp. 331–336.*

*Primary Examiner*—Constantine Hannaher
*Assistant Examiner*—Shun Lee
(74) *Attorney, Agent, or Firm*—Brian S. Steinberger; Law Offices of Brian S. Steinberger, P.A.

(57) ABSTRACT

A single crystal having the general composition, $Ce_{2x}(Lu_{1-y}Y_y)_{2(1-x)}SiO_5$ where x=approximately 0.00001 to approximately 0.05 and y=approximately 0.0001 to approximately 0.9999; preferably where x ranges from approximately 0.0001 to approximately 0.001 and y ranges from approximately 0.3 to approximately 0.8. The crystal is useful as a scintillation detector responsive to gamma ray or similar high energy radiation. The crystal as scintillation detector has wide application for the use in the fields of physics, chemistry, medicine, geology and cosmology because of its enhanced scintillation response to gamma rays, x-rays, cosmic rays and similar high energy particle radiation.

14 Claims, 5 Drawing Sheets

SCINTILLATING DETECTORS

U.S. PATENT DOCUMENTS

| | | | | |
|---|---|---|---|---|
| 5,003,181 A | * | 3/1991 | Morlotti | 250/484.4 |
| 5,025,151 A | * | 6/1991 | Melcher | 250/269.6 |
| 5,164,041 A | * | 11/1992 | Berkstresser et al. | 117/19 |
| 5,500,147 A | * | 3/1996 | Fitzpatrick | 252/301.6 S |
| 5,610,967 A | * | 3/1997 | Moorman et al. | 378/154 |
| 5,644,612 A | * | 7/1997 | Moorman et al. | 378/98.2 |
| 5,651,047 A | * | 7/1997 | Moorman et al. | 378/98.8 |
| 5,660,627 A | * | 8/1997 | Manente et al. | 117/12 |
| 5,690,731 A | * | 11/1997 | Kurata et al. | 117/13 |
| 5,729,584 A | * | 3/1998 | Moorman et al. | 378/146 |
| 5,751,785 A | * | 5/1998 | Moorman et al. | 378/146 |
| 5,835,561 A | * | 11/1998 | Moorman et al. | 378/98 |
| 5,859,893 A | * | 1/1999 | Moorman et al. | 378/154 |
| 6,323,489 B1 | * | 11/2001 | McClellan | 250/361 R |

* cited by examiner

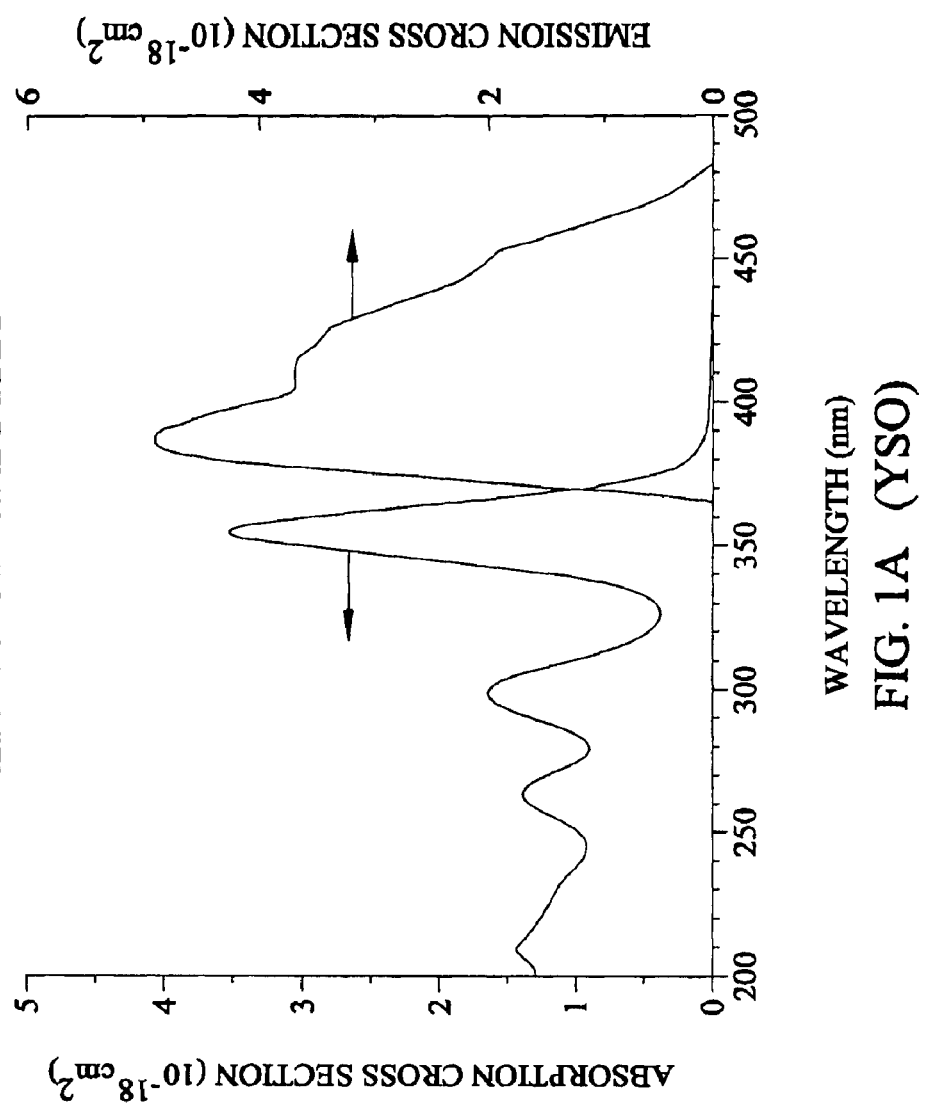
FIG. 1A (YSO)

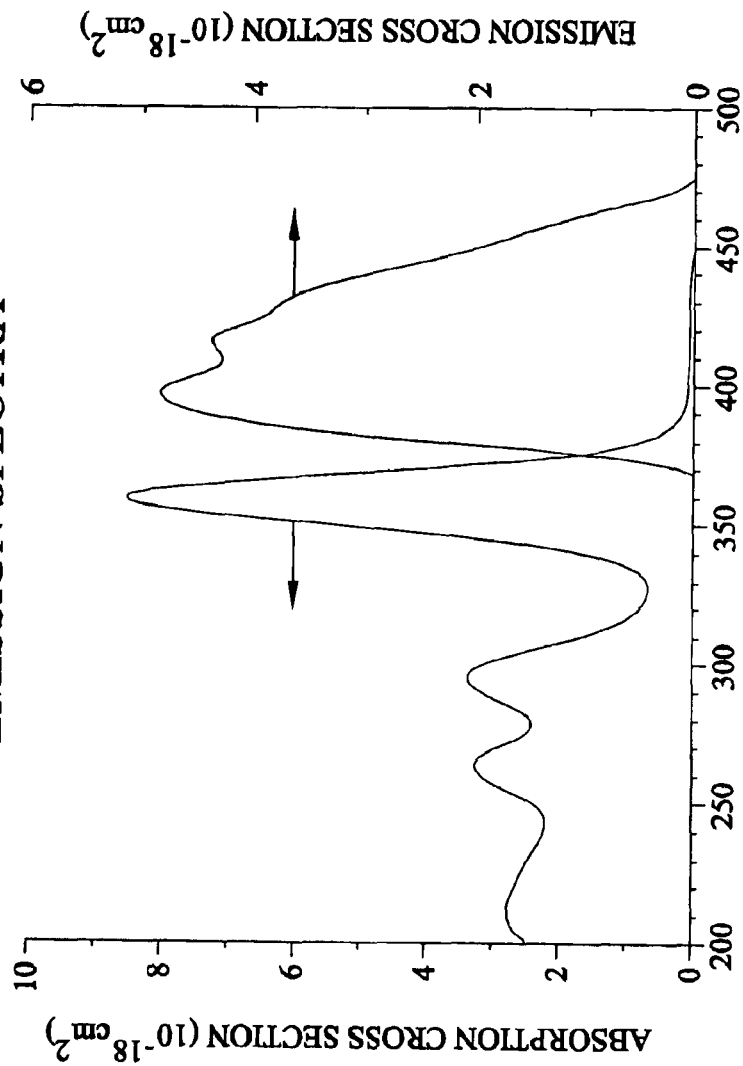
FIG. 1B (LSO)

LUTETIUM YTTRIUM ORTHOSILICATE SINGLE CRYSTAL SCINTILLATOR DETECTOR

This is a Divisional of application Ser. No. 09/506,160 filed Feb. 17, 2000, now U.S. Pat. No. 6,624,420. This invention relates to a single crystal as scintillating detector for gamma ray or similar high energy radiation which single crystal is composed of Cerium doped Lutetium Yttrium orthosilicate (LYSO) with the general composition of $Ce_{2x}(Lu_{1-y}Y_y)_{2(1-x)}SiO_5$ where x=0.0001 to 0.02 and y=0.0001 to 1.9999 and claims priority based on U.S. Provisional Application Ser. No. 60/120,500 filed Feb. 18, 1999.

BACKGROUND AND PRIOR ART

There are a number of ways to detect high energy radiation. Some of the equipment can be quite bulky, such as a cloud chamber, others may not be as sensitive or quantitative. Scintillator is a very simple but also very accurate method to detect high energy radiation such as x-rays, gamma-rays, high energy particles exceeding a few kilo-electron-volts (KeV) in energy. When high energy radiation strikes on a scintillating crystal, it creates a large number of electron-hole pairs inside the crystal. Recombination of these electron-hole pairs will release energy in the range of a few eV. This energy can be emitted directly from the recombination center as light or transferred to a light emitting ion center which then emits a specific wavelength of light. This low energy emission can then be detected by a photomultiplier tube, avalanche photo diode (APD) or other detector systems with sufficient sensitivity. The higher the light emission (or light yield), the easier for the detector design.

The first scintillating crystal is calcium tungstate ($CaWo_4$) which was used before the turn of this century to detect x-rays. The most significant discovery of a scintillating crystal is Thallium-activated sodium iodide NaI(Tl)) in the mid-40's. Even now, it is still the most widely used scintillating crystal. This is because large size crystals are readily available and quite inexpensive. Moreover, the light yield is the highest among all the known materials and is still the benchmark standard for all other scintillator crystals even after all these years. Even though NaI(Tl)) is widely used, it is not without problems. It is hygroscopic and very soft. Moreover, the density is too low (37 g/cm³), the effective mass number ($Z_{eff}$) of 49 is also too small. It has a large and persistent after glow which interferes with the intensity counting system. Finally, the decay time about of 230 nanoseconds (ns) is too slow for many applications.

Since the turn of this century; there are a large number of crystals proposed for potential scintillating applications. Even though they do show scintillating properties, none of them has all the right properties. The common problems are low light yield, physical weakness and difficulty in producing large size high quality single crystals. Despite the problems, a number of them have found applications in physics, chemistry, geology and medicine. One common feature of all these usable crystals is that they are the only crystals which can be produced in large size and high quality by an industrial manufacturing process with reasonable cost. This has proven to be the most important factor than the details of scintillating properties to be considered as a viable scintillator material. The specific examples include bismuth germanate ((BGO) which is $Bi_4Ge_3O_{12}$), cerium doped gadolinium orthosilicate ((GSO) which is $Gd_2SiO_5$) and cerium doped lutetium orthosilicate ((LSO) which is $Lu_2SiO_5$).

BGO was found in the early 70's. It has higher density (7.13 g/cm³), and is non-hygroscopic. But it also has problems such as low light yield (15% that of NaI(Tl)), slow decay time (300 ns) and high refractive indices (n=2.15) which results in light loss due to internal reflection. Still BGO scintillator crystals are now used in high energy calorimetry in particle physics research Institutes. It is also used as the detector for the 511 keV gamma-ray radiation of the positron emission tomographs (PET) in medical imaging application. Because of the low light and slow decay, the image produced from the BGO PET machine tends to be blurred with poor resolution.

In early 80's, the Ce doped GSO crystal was disclosed as a scintillator material. It has adequate density (6.71 g/cm³) and is also non-hydrogroscopic. The light yield is 20% of that obtained with NaI(Tl) with a much faster decay time (60 ns). Even though GSO crystals over 80 mm diameter have been produced, the crystal has not yet made it in the PET market because of a strong cleavage plane. It is very difficult to cut and polish the crystal into any specific shape without the risk of fracturing of the entire crystal. Another unexpected problem is the high thermal neutron capture cross-section (49,000 barns) of the gadolinium. It will interfere with the gamma rays generated by neutron irradiation source. However, since there is no neutron source involved in the PET process, gadolinium containing GSO is not a problem.

In the late 80's, the Ce doped LSO crystal was disclosed as a good scintillator material. Similar to GSO, it has high density (7.4 g/cm³) and is non-hygroscopic. The light yield is significantly better and close to 75% that of NaI(Tl)) and the decay time is even faster (42 ns). The index of refraction is also very low (n=1.82). Moreover, since LSO has a totally different crystal structure from GSO, it is fortuitous that in LSO structure, there is not any distinct cleavage plane making the material more suitable for detector block fabrication without the serious risk of fracturing. The thermal neutron capture cross-section is very low (84 barns) as compared to GSO. Lastly, it is now possible to commercially produce high quality, large size single crystals of LSO. Compared with all the other existing known scintillator crystals, Ce doped LSO seems to have the best combination of all the needed properties for PET or other high energy gamma-ray detector application.

Unfortunately, the lutetium element of the crystal contains a trace amount of a natural long decay radioactive isotope, $Lu^{176}$, which will provide some background count rate that can be harmful for certain highly sensitive detector applications and the crystal has very deep trap centers. This is evidenced by the very long phosphorescence after exposure to any UV light source. The light output measurement of a large number of LSO crystals shows an anti-correlation between trap-related integrated thermoluminescence output and scintillation light output over a range of several orders of magnitude. At present time, the crystal defect is the most serious issue. One can have two crystals with identical appearance with one having 100% light yield and the other failing to scintillate. Thus far, there is no understanding how these deep traps are formed in the first place and there is also no remedy how to reduce or eliminate them.

At present, the scintillation process has been well accepted and used in many applications. The basic mechanism is also reasonably well understood. It is generally accepted that the basic scintillation process involves three steps: (1) the absorption of the incident high energy radiation and the conversion into a large number of low energy (a few multiples of the band gap energy) electrons and hole pairs;

(2) transfer the electron-hole recombination energy to the luminescence centers before its loss to multi phonon relaxation processes; and, (3) the radiative emission of the transferred energy. In other word, the scintillation efficiency (L) can be expressed as:

$$E = \beta \times S \times Q$$

where $\beta$ is the conversion efficiency, S is the transfer efficiency and Q is quantum efficiency of the radiation centers. Despite the understanding of scintillating mechanism based on the known materials, there is still lack of any good model which has the capability to predict the scintillating behavior of a specific compound. The quantum efficiency of an emission center can be predicted and tested optically; however, neither the total number of electron-hole pairs generated by an incident gamma ray radiation nor the transfer efficiency can be predicted or independently tested. In the end, the only way to confirm the scintillating behavior of a compound is to make and then test it.

SUMMARY OF THE INVENTION

The first objective of the present invention is to provide a scintillation detector for use as a high-energy radiation detector.

The second objective of this invention is to provide an improved scintillation crystal for use as a gamma ray or other high energy radiation detector.

The third objective of this invention is to provide a monocrystalline scintillation crystal of improved performance for use as a gamma ray or other similar high energy radiation detector.

In the subject invention, an improved scintillation detector assembly has been realized comprising: a cerium doped lutetium yttrium orthosilicate crystal; and, a photodetector, comprising a charge-coupled device, coupled to said crystal whereby an electrical signal is generated in response to a light pulse from said crystal when exposed to a high energy gamma ray. The crystal is preferably transparent, monocrystalline and of a general composition of $Ce_{2x}(Lu_{1-y}Y_y)_{2(1-x)}SiO_5$ where x=0.00001 to 0.02 and y=0.0001 to 1.9999, with a luminescence wavelength of approximately 420 nm and a luminescence decay of approximately 35 to 45 ns, whereby the detector utilizing said crystal as the scintillator responsive to gamma and other similar high energy radiation is particularly useful in the fields of physics, chemistry, geology and cosmology.

BRIEF DESCRIPTION OF THE FIGURES

FIGS. 1a and 1b shows absorption and emission spectra of pure YSO and LSO.

DESCRIPTION OF REPRESENTATIVE EMBODIMENT

Figure 2:
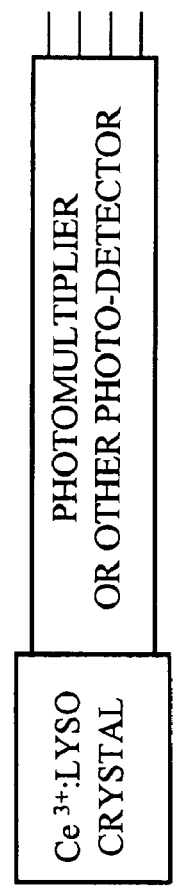
FIG. 2 is a pictoral representation of a typical cerium doped LYSO scintillating detector.

For illustrative purpose, a representative embodiment of the invention is described hereinafter in the context for the detection of high energy gamma rays. It will be understood that the LYSO single crystal scintillator of the invention is not limited to the detection of gamma ray radiation but it has the general application for the detection of other types of radiation such as x-rays, cosmic and other high energy particle rays.

In the background review, it is mentioned that Ce doped LSO has the best scintillating properties among all the known materials. But is still has a few serious problems to over come; namely, the isotope problem and the defect (deep trap) problem. In addition to these physical issues, LSO crystals also face two tough economic issues. First is the high melting temperature for growth. The melting point of LSO is estimated around 2200° C. It is among the highest melting temperature crystals produced commercially. Special high temperature ceramics were used to build the furnace and Iridium crucibles were used to contain the melt for growth. The growth process is quite detrimental to both insulation and the crucible. High cost of frequent replacement of the hardware pushes cost too high to be bearable for practical use. Second is the high cost of raw material of lutetium oxide. It is not a common material. Moreover, the current material purity around 99.99% is not sufficient to guarantee consistent high light yield. It is highly desirable to reduce or even replace lutetium oxide as the main ingredient in new scintillator crystals.

The embodiment of this invention is to design a new crystal which can eliminate most of the problems of LSO crystal without sacrificing the scintillating properties. Our initial motivation is to reduce the growth temperature of LSO single crystals. It is a very difficult task to maintain the operation at such high temperature for long period of time greater than 1 week). Since YSO has lower melting temperature near 2070° C., we are seeking the possibility to find an intermediate composition (or LYSO composition) which may melt at lower temperature to ease the growth process. We also want to minimize the yttrium content to retain the LSO scintillating properties.

Since there is no known published phase diagram between YSO and LSO, the phase relationship of the intermediate composition is not available. We speculate the melting and crystallization behavior of the intermediate LYSO crystal composition based on two assumptions. First, since both YSO and LSO have the same crystallographic structure and the ionic size of yttrium 3+ ion (0.090 nm) and lutetium 3+ ion (0.088 nm) are very similar, we assume that there is a 100% miscibility between the two compositions. In other words, it is possible to make any intermediate composition LYSO crystals without worry about phase separation or formation of new compounds. Second, since YSO has lower melting temperature, based on the model of ideal solid solution, it is expected that all the intermediate compositions will have lower melting temperature similar to the classic example of fosterite ($Mg_2SiO_4$)-fayalite ($Fe_2SiO_4$) pseudo-binary phase relations even though the exact position of the solidus and liquidus lines are not known.

In order to understand the melting and crystallization behavior, four intermediate LYSO charge compositions were prepared. The compositions were: $Ce_{0.002}(Lu_{0.7}Y_{0.3})_{1.998}Si_2O_5$ designated (70% LYSO); $Ce_{0.002}(Lu_{0.5}Y_{0.5})_{1.9998}Si_2O_5$ designated (50% LYSO); $Ce_{0.002}(Lu_{0.3}Y_{0.7})_{1.998}Si_2O_5$ designated (30% LYSO); and, $Ce_{0.002}(Lu_{0.15}Y_{0.85})_{1.998}Si_2O_5$ designated as (15% LYSO). The percentage refers to the fraction of the lutetium in the crystal. A pure LSO charge was also prepared to be processed in a similar way as a reference for direct comparison. To make sure that the property comparison is meaningful, all the LYSO crystal preparation procedures are identical. The same total number of moles of chemicals in each case were used so that the finished crystals are near identical in size. To minimize the repetition, the 70% LYSO composition is hereafter set forth as the example to illustrate the preparation for all examples:

A mixture of high purity fine powders consisting of 1476 grams of $Lu_2O_3$, 359 grams of $Y_2O_3$, 317 grams of $SiO_2$ and 3.6 grams of $CeO_2$ were mechanically mixed thoroughly. The purity of $Lu_2O_3$ is 99.99%. The purity of both $Y_2O_3$ and $SiO_2$ is 99.9999.

(2) The mixed charge is placed in a 75 mm diameter by 75 mm deep iridium metal crucible and melted in a 50 kilowatt maximum power radio frequency (RF) heated high temperature furnace (3) When the charge is fully molten and stabilized at near the melting temperature, a pure LSO seed crystal is lowered into the furnace and touched to the top center of the melt surface and the system is let to equilibrate.

(4) Once the seed is in equilibrium with the melt, the seed is pulled up slowly with rotation. A computer controlled automatic diameter controlled program is used to finish the growth to a crystal diameter of 30 mm while using a pull rate of 1.5 mm per hour.

(5) When the crystal has reached the desired length, it is separated from the melt and let cool slowly in the furnace to room temperature. The crystal is then recovered from the furnace and cut to smaller pieces for evaluation.

In order to check the melting behavior, an oversized crystal was grown in order to convert the maximum amount of melt to crystal. The resulting 30% LYSO crystal had a total length of 32 cm and a total weight of 1880.5 grams. The crystal took 8 days to complete the growth. In this case, the bottom 5 cm portion of the crystal contains a lot of visual inclusions and defects and thus was not usable for evaluation. It did, however, provide important information on the stability range of the melt.

Five crystals were grown consecutively in the same crucible and furnace at near identical growth conditions. There appeared to be no difference in crystal quality among all the five crystals. More interestingly, the fraction of the usable melt seems also to be quite the same regardless of the lutetium to yttrium ratio. This allows adjusting the crystal composition to best fit any specific application. In addition to the compositional flexibility, there was a significant lowering of the melting temperature which facilitates growth of these crystals.

To evaluate the scintillating properties, two 10 mm slabs were cut from each crystal, one from the top of the crystal and one from the bottom right above the defect region. It has been found that the scintillating light yield of any LSO crystal decreases systematically form the top to the bottom of the boule. The relative light yield can vary by as much as a factor of 2. It appears that this is due to the impurities in the lutetium oxide ($Lu_2O_3$) source material. Since the LYSO also uses the same $Lu_2O_3$ starting material, the LYSO will also show the same behavior.

The slab is placed under a $Na^{22}$ radiation source which generates the 511 keV gamma ray as the incident light. The scintillating light from the LYSO slab is captured by a Hamamatsu R877 photomultiplier. The scale used for the light output measurement is arbitrary unit. In this case, the light output for a standard NaI(Tl) scintillator is set a 100%. In comparison, the standard BGO crystal has a light output of 12.5%. The energy resolution is expressed as the full width at half maximum of the 511 keV gamma ray peak. The result of the measurement is summarized in Table 1 and plotted in FIG. 3.

TABLE 1

|  | YSO | 15% LYSO | 30% LYSO | 50% LYSO | 70% LYSO | LSO |
|---|---|---|---|---|---|---|
| Light yield % | | | | | | |
| (top) | 68 | 70 | 85 | 94 | 96 | 93 |
| (bottom) | 24 | 28 | 71 | 67 | 60 | 46 |
| Energy Resolution % | | | | | | |
| (top) | 12 | 9 | 9 | 9 | 8 | 10 |
| (bottom) | 21 | 18 | 13 | 11 | 13 | 16 |
| Effective Z | 33 | 44 | 52 | 58 | 63 | 66 |
| Density | 4.62 | 5.04 | 5.45 | 6.01 | 6.57 | 7.4 |
| Radiation length (cm) | 9.5 | 4.5 | 2.3 | 1.6 | 1.2 | 1.1 |
| Phosphorescence | No | No | No | very weak | weak | Yes |

First, the top portion of each crystal has the best scintillating value n since the crystallization process has been found to be a purification process. This result has many important implications. The top portion of the crystal will have the least impurity content and thus the best performance. It is interesting to note that the pure LSO crystal has produced light yield of 93% of that of NaI(Tl). This is significantly higher than the published result of 75%. This value may approach the ultimate scintillating power for LSO.

Second, simply because of the top portion of each crystal has the highest purity, these measured values are good gauges for the comparison of the ultimate scintillating efficiency of these crystals. The light yield (or scintillating efficiency) remains constant for at least 50% percent substitution of lutetium with yttrium. Degradation of the light yield occurs after 70% replacement of lutetium. All the samples are of approximately equal thickness of 1 cm with no correction imposed the reduction of density or effective Z. The scintillating efficiency drops rapidly with further addition of yttrium and the Compton signal rises rapidly with more than 85% substitution. The simple conclusion can be drawn that LYSO is a valuable and very efficient scintillator as long as the crystal contains more than 30% lutetium.

Third, the result also shows the rapid reduction of the light yield as the growth is progressing and the greater fraction of the melt is converted to crystal. This is consistent with all the published speculation that impurities are the primary cause to create the deep trap, which gives the long phosphorescence and reduces the scintillating light yield. In the case of pure LSO, the light yield drops by a factor of 2 when 80% of the melt is converted to crystal. This is the largest drop as compared to all the other LYSO crystals.

Figure 3:
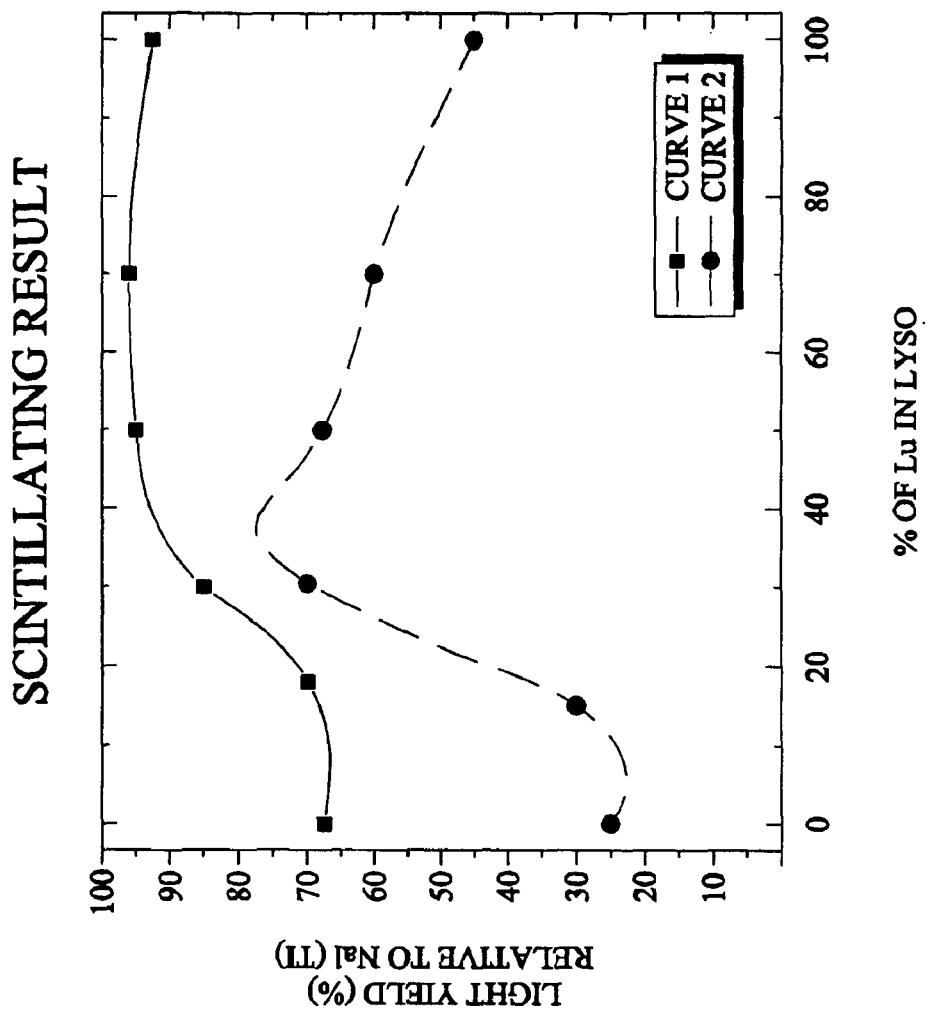
FIG. 3 shows the LYSO scintillating light yield intensity as a function of lutetium concentration.

In FIG. 3, it is shown that there is a linear reduction of light yield for the bottom portion of the LYSO and LSO crystals with linear increasing of lutetium content. This is the most direct evidence to show that the impurity is coming from the $Lu_2O_3$ starting material. The phosphorescence is greatly reduced with more yttrium substitution and is nearly unnoticed beyond 50% substitution.

In addition to the advantage directly observed from the light yield measurements, LYSO also resolves other problems associated with pure LSO. First, the growth temperature of LYSO is lower than that of pure LSO by approximately 100° C. which is very significant in high temperature processes. Since the radiation heat loss is proportional to the $4^{th}$ power of temperature (or Tn) the high temperature insulation and iridium crucible will last longer. Second, substituting yttrium will reduce proportionally the trace concentration of the naturally radioactive $Lu^{176}$ isotope without sacrificing the net light yield. This will, in effect, reduce the background noise of the detector. Third, both the cost and purity of the $Lu_2O_3$ starting material is a serious issue. Thus, Yttrium substitution will reduce the cost and improve the uniformity of scintillating efficiency for large single crystal plates. Further, since a low index of refraction is preferred for scintillating crystals to reduce the effect of total internal reflection, the substitution of yttrium reduces the already low value of the index of refraction of LSO.

Figure 4:
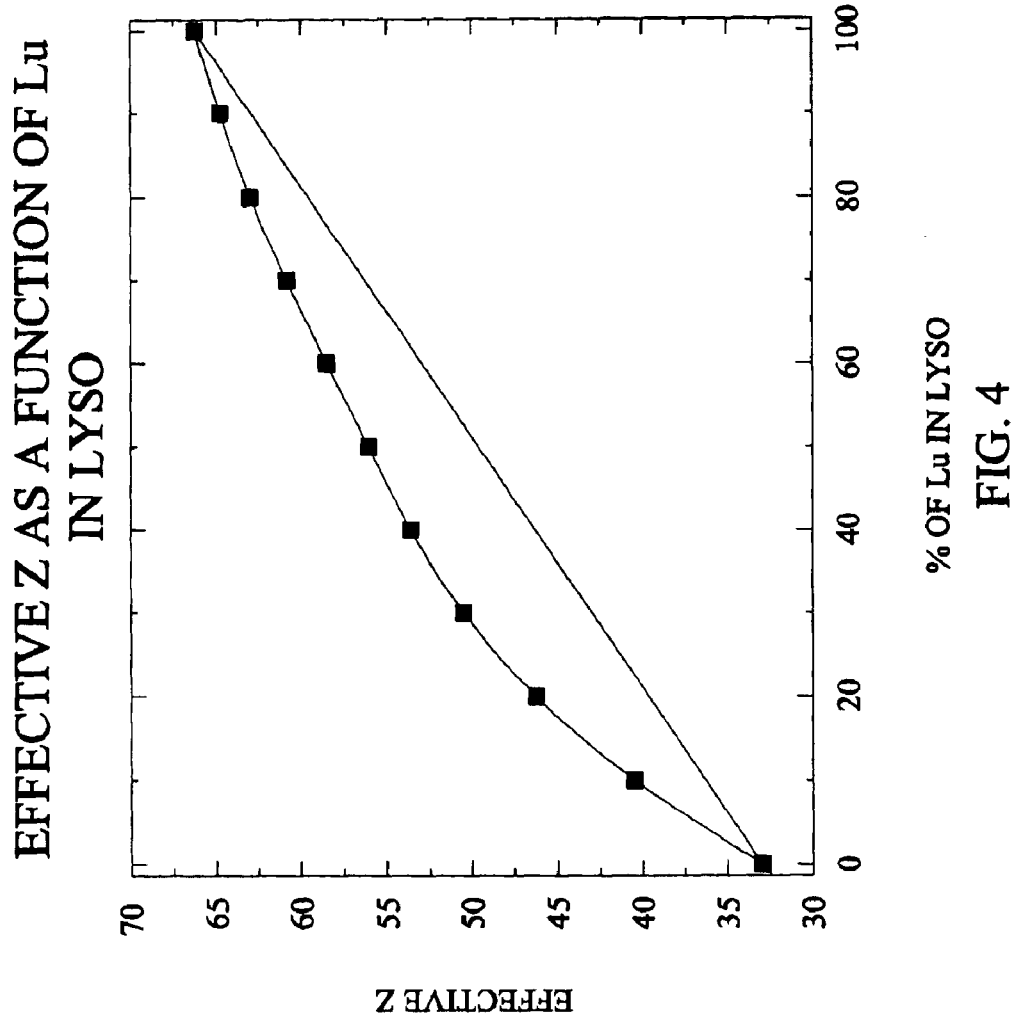
FIG. 4 shows the change of effective Z of LYSO as a function of lutetium concentration.

Lastly, let us examine the issue of stopping power, radiation length and effective Z. For practicality, it is desirable to use material with highest Z and shortest radiation length. Interesting enough, we find that in the case of LYSO, the effective Z increases rapidly with small substitution of lutetium. It will eventually slow down when it approaching to 100% substitution. FIG. 4 illustrates such effect. As a consequence, 30% LYSO has the same effective Z as NaI (Tl) and 60% LYSO has the same effective Z as GSO. In terms of the radiation length, we can save 30% lutetium with 10% increase of radiation length, save 50% and 70% lutetium with 1.5 and 2 times that of pure LSO. In other words, the reduction is not linear to the substitution. In fact, it is favor for the substitution.

FIG. 2 illustrates the structure of the scintillation device with the crystal of the invention optically connected to the photomultiplier or other photon detector, which can include a photomultiplier tube, a PIN diode, and an APD(avalanche photo detector) diode.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A composition for the detection of energy radiation comprising: a cerium doped lutetium yttrium orthosilicate mono crystal wherein the crystal includes: a monocrystalline structure of cerium doped lutetium yttrium orthosilicate, $Ce_{2x}(Lu_{1-y}Y_y)_{2(1-x)}SiO_5$ where x=approximately 0.00001 to approximately 0.05 and y=approximately 0.0001 to approximately 0.9999.

2. The composition of claim 1 wherein x ranges from approximately 0,0001 to approximately 0.001 and y ranges from approximately 0.3 to approximately 0.8.

3. A method of making a scintillation crystal comprising the steps of:
   (a) mixing $Lu_2O_3$, $Y_2O_3$, $CeO_2$, $SiO_2$ together to form a mixture;
   (b) heating the mixture;
   (c) interacting the heated mixture with an LSO seed crystal; and
   (d) growing an LYSO crystal from the interaction.

4. The method of claim 3 wherein $Lu_2O_3$ is substantially pure.

5. The method of claim 3 wherein $Y_2O_3$ is substantially pure.

6. The method of claim 3 wherein $SiO_2$ is substantially pure.

7. The method of claim 3, wherein the heating step includes: heating the mixture to a molten state.

8. The method of claim 3, wherein the growing step includes: separating said LYSO crystal from the melt and cooling said LYSO crystal.

9. A crystal scintillator comprising a parent-single crystal of cerium-activated lutetium yttrium oxyorthosilicate having the general formula $Lu_{(2-X-Z)}Y_XCe_ZSiO_5$, wherein $0.05 \leq x \leq 1.95$ and $0.001 \leq z \leq 0.02$.

10. The crystal scintillator of claim 9, wherein $0.2 \leq x \leq 1.8$.

11. A scintillation detector, comprising:
   (a) A crystal scintillator comprising a parent-single crystal of cerium-activated lutetium yttrium oxyorthosilicate having the general formula $Lu_{(2-X-Z)}Y_XCe_ZSiO_5$, wherein $0.05 \leq x \leq 1.95$ and $0.001 \leq z \leq 0.02$; and
   (b) A photodetector optically coupled to said crystal scintillator for detecting light from said crystal scintillator.

12. The detector of claim 11, wherein said photodetector comprises a photomultiplier tube.

13. A scintillator detector, comprising:
   (a) a crystal scintillator comprising a single crystal of cerium-activated lutetium yttrium oxyorthosilicate having the general formula $Lu_{(2-X-Z)}Y_XCe_ZSiO_5$, wherein $0.2 \leq x \leq 1.8$ and $0.001 \leq z \leq 0.02$; and
   (b) a photodetector optically coupled to said crystal scintillator for detecting light from said crystal scintillator.

14. The detector of claim 13, wherein said photodetector comprises a photomultiplier tube.

* * * * *